(12) United States Patent
Watanabe et al.

(10) Patent No.: US 6,848,814 B2
(45) Date of Patent: Feb. 1, 2005

(54) VEHICLE HEADLAMP

(75) Inventors: Shigeyuki Watanabe, Shizuoka (JP); Katsuhito Mochizuki, Shizuoka (JP); Takashi Hori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 94 days.

(21) Appl. No.: 10/272,955

(22) Filed: Oct. 17, 2002

(65) Prior Publication Data
US 2003/0072164 A1 Apr. 17, 2003

(30) Foreign Application Priority Data
Oct. 17, 2001 (JP) .................................. P. 2001-319102

(51) Int. Cl.$^7$ ................................................ B60Q 1/00
(52) U.S. Cl. ........................ 362/465; 362/468; 362/530; 362/324; 362/523; 362/418
(58) Field of Search .................. 362/324, 523, 362/418, 285, 465, 468, 530

(56) References Cited

U.S. PATENT DOCUMENTS 4,831,506 A * 5/1989 Miyazawa .................. 362/526
6,332,702 B1 * 12/2001 Hebler et al. ............... 362/523
6,527,424 B2 * 3/2003 Rosenhahn et al. ......... 362/513

FOREIGN PATENT DOCUMENTS

| JP | 2001-325816 | 11/2001 |
|----|-------------|---------|
| JP | 2001-325817 | 11/2001 |

OTHER PUBLICATIONS

Patent Abstracts of Japan, Publication No. 01–197901 (Aug. 9, 1989).

* cited by examiner

Primary Examiner—Stephen Husar
Assistant Examiner—Anabel Ton
(74) Attorney, Agent, or Firm—Fish & Richardson P.C.

(57) ABSTRACT

A headlamp in which a frame member 50 is supported on a lamp body 14 in a vertically swingable fashion, and a lighting device unit 20 is supported on said frame member 50 in a horizontally swingable fashion. A control unit 108 controls the circular movement of said frame member 50 and said lighting device unit 20 in accordance with vehicle running conditions. With such a construction, a beam emitted from said lighting device unit 20 may be vertically and horizontally varied in its direction in accordance with vehicle running conditions.

6 Claims, 11 Drawing Sheets

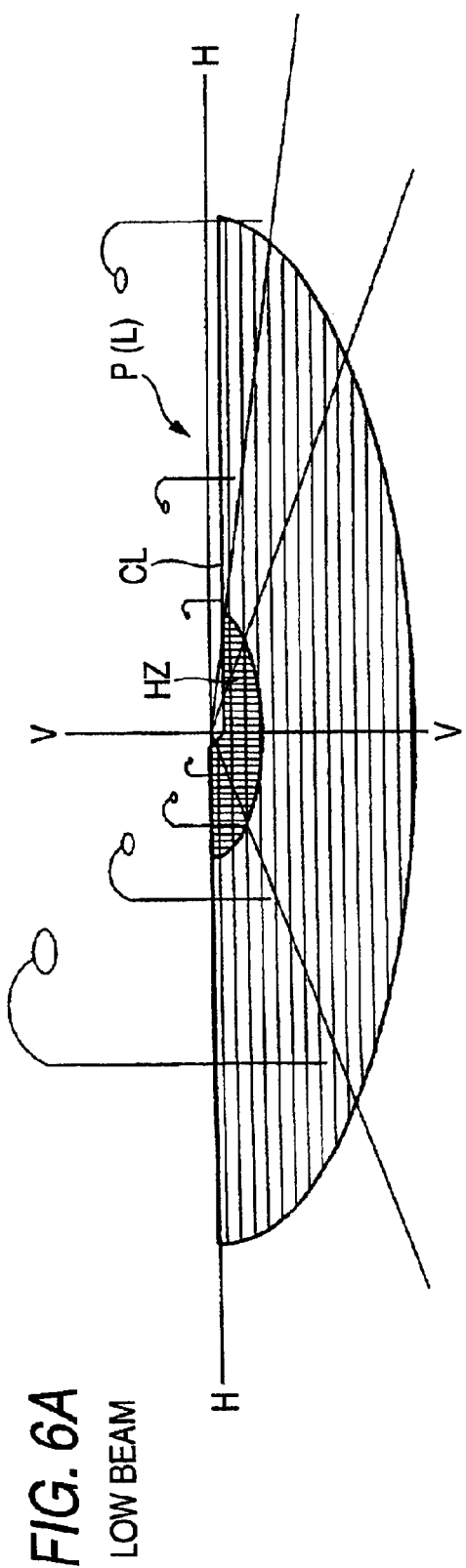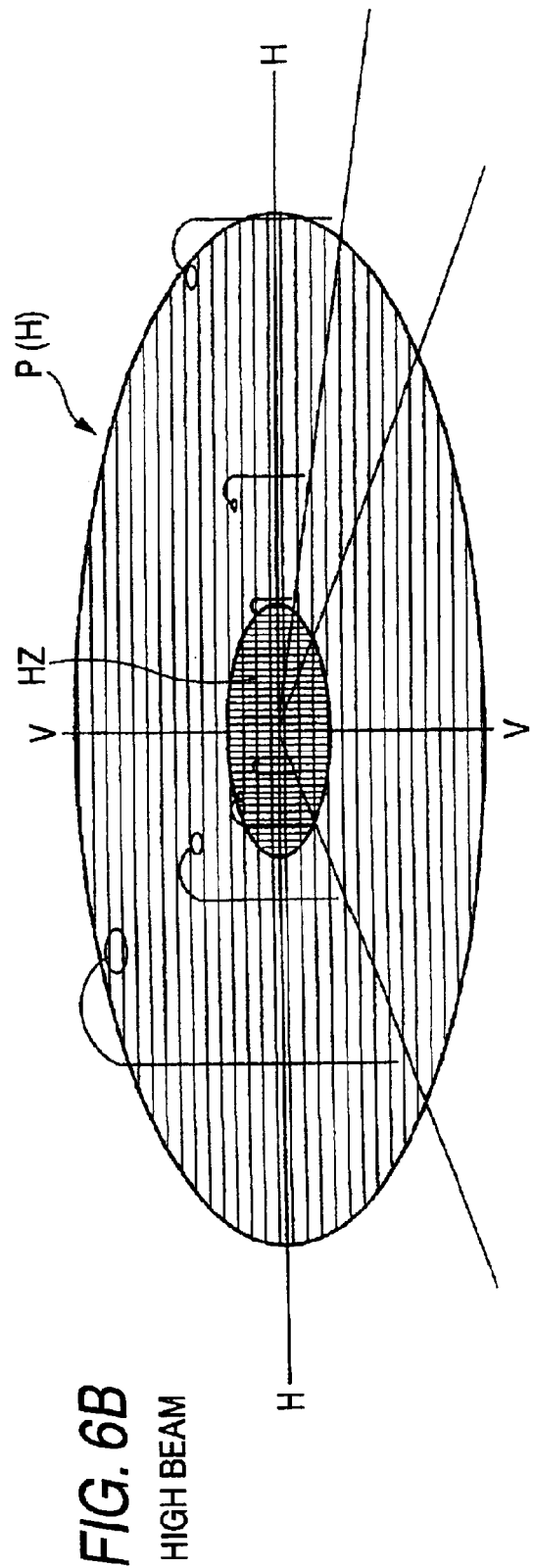
FIG. 6A LOW BEAM
FIG. 6B HIGH BEAM

LOW BEAM

HIGH BEAM

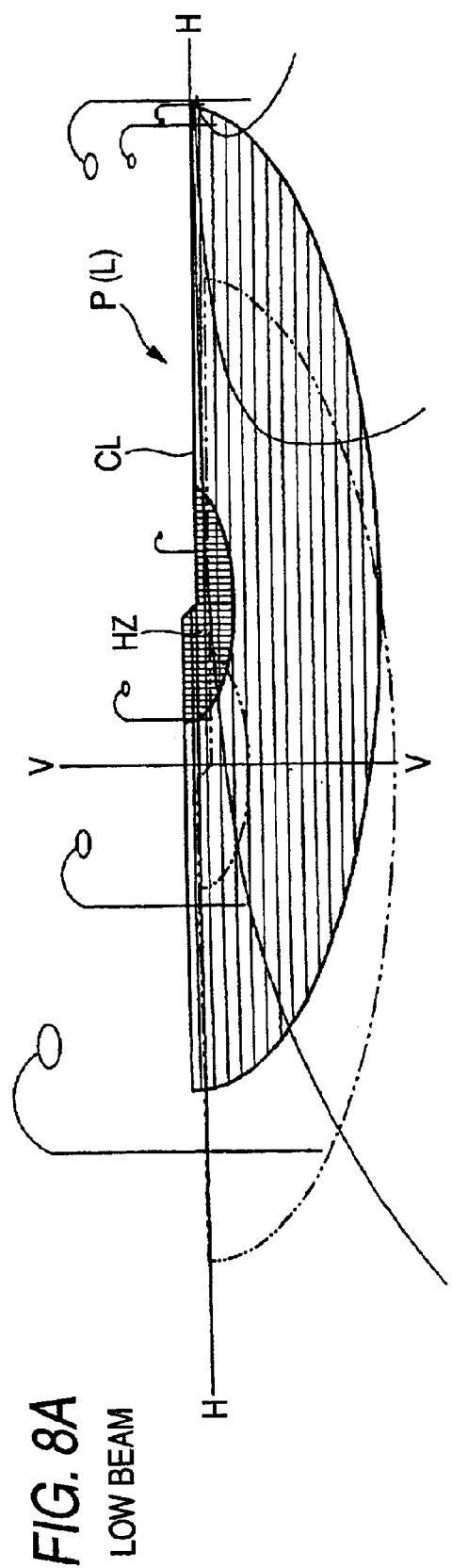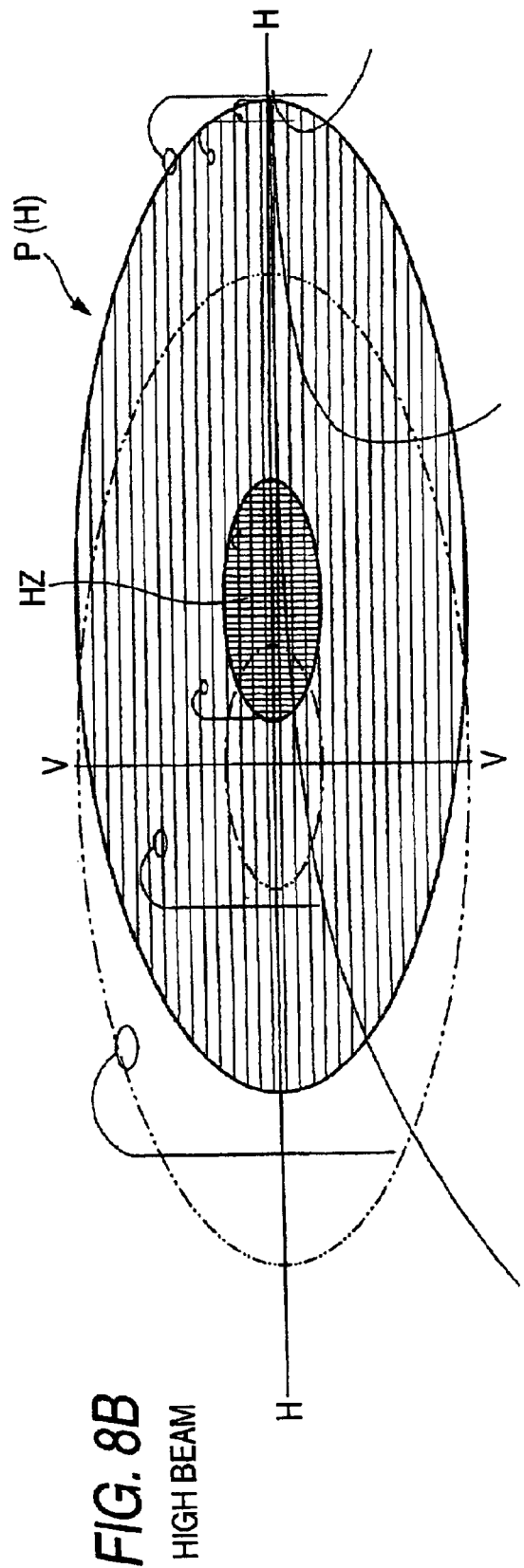
FIG. 8A LOW BEAM
FIG. 8B HIGH BEAM

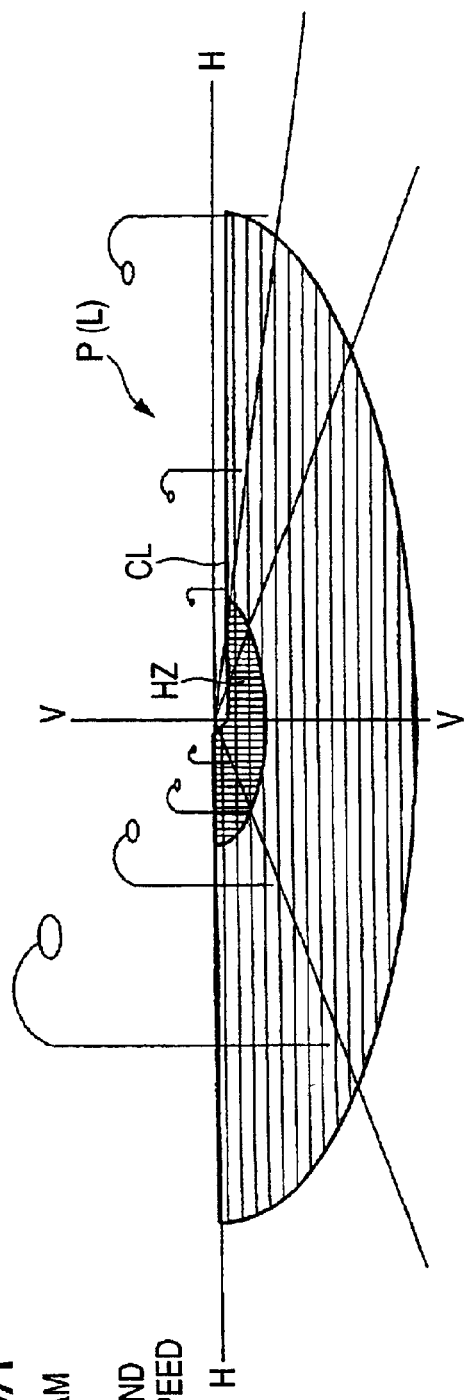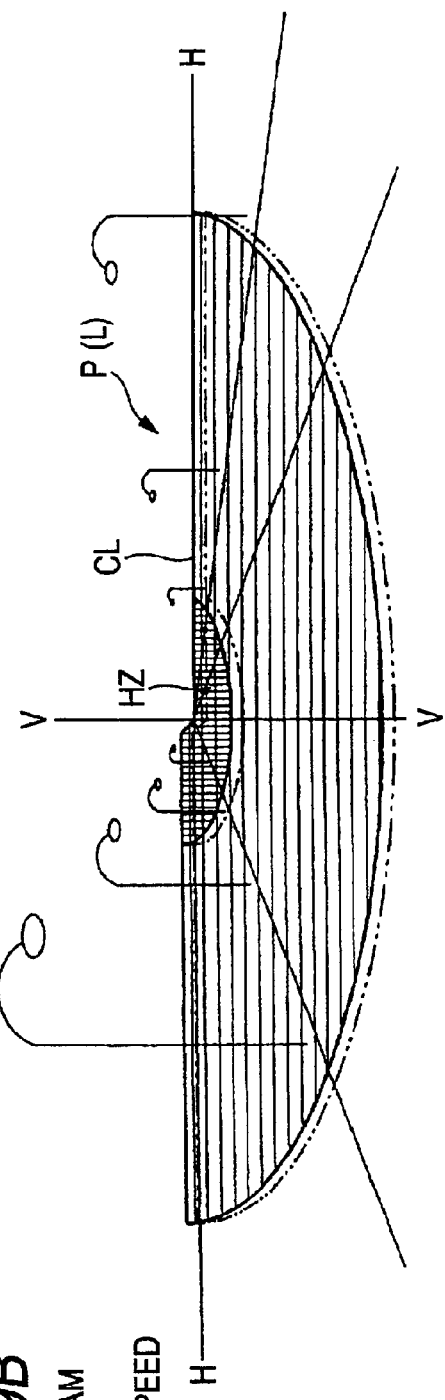
FIG. 9A LOW BEAM AT LOW AND MEDIUM SPEED
FIG. 9B LOW BEAM AT HIGH SPEED

LOW BEAM
WHEN THE VEHICLE TURNS
TO THE LEFT AT HIGH SPEED

LOW BEAM
WHEN THE VEHICLE TURNS
TO THE RIGHT AT HIGH SPEED

VEHICLE HEADLAMP

BACKGROUND OF THE INVENTION

The invention of the present patent application relates to a vehicle headlamp in which a lighting device unit for providing a forward beam illumination in a predetermined light distribution pattern is accommodated within a lamp body.

There is known a headlamp of the type in which the lighting device unit is accommodated in the lamp body. Japanese Patent Publication Hei-1-197901 discloses a technique, though it is that of a fog lamp, in which a movable reflecting mirror of the lighting device unit is horizontally swung in accordance with a steering angle to thereby horizontally displace a light distribution pattern. If the technique is applied to the vehicle headlamp, it is possible to enhance a visibility of the road surface in front of a vehicle when the vehicle turns to the right or left.

The technique of merely swinging the movable reflecting mirror as one of the components of the lighting device unit in the horizontal directions can illuminate the fore scene with an insufficient amount of light in the turning direction of the vehicle. When the vehicle runs on a curved road with a small radius of curvature or turns at the intersection, it is necessary to greatly turn the movable reflecting mirror in the horizontal directions. When it is greatly turned, a light distribution pattern is greatly deformed, however. In this condition, it is difficult for the beam to illuminate the fore scene in a light distribution pattern which reflects current, incessantly varying vehicle running conditions.

Further, the technique of merely displacing the light distribution pattern in the horizontal directions is insufficient in securing the beam illumination in a light distribution pattern which reflects current, incessantly varying vehicle running conditions. When the vehicle speed is relatively low, an observation point of a driver is present at a relatively short distant region on the road surface in front of a vehicle. As the vehicle speed increases, the driver's observation point gradually moves to a distant point. For this reason, it is desirable to vertically move the illumination point of the light distribution pattern with the movement of the observation point. The technique of merely displacing the light distribution pattern in the horizontal directions, however, fails to satisfy such a desirable requirement.

SUMMARY OF THE INVENTION

Accordingly, an object of the present invention is to provide a vehicle headlamp of the type in which a lighting device unit for providing a forward beam illumination in a predetermined light distribution pattern, is accommodated within a lamp body, which the headlamp provides a beam illumination in a light distribution pattern which reflects current, incessantly varying vehicle running conditions.

The present invention achieves the above object by introducing an inventive and unique technical idea into a support structure of the lighting device unit.

In a headlamp in which a lighting device unit for providing a forward beam illumination in a predetermined light distribution pattern, is accommodated within a lamp body, the technical idea of the present invention is implemented such that a frame member is swingablly supported on the lamp body in vertical or horizontal direction, and a lighting device unit is swingably supported on the frame member in a horizontal or vertical direction, and a control unit controls the circular movement of the frame member and the lighting device unit in accordance with vehicle running conditions.

The term "lighting device unit" is not limited to a specific form. Specifically, the lighting device unit may be constructed as a projector type unit which includes a light source disposed on an optical axis extending in a longitudinal direction of the vehicle, a reflector for reflecting the rays of light emitted from the light source forward and toward the optical axis, a projection lens provided in front of the reflector, and a shade for intercepting part of reflection light from the reflector, the shade being located between the projection lens and the reflector. Further, the lighting device unit may be constructed as a parabolic lighting device unit which includes a light source disposed on an optical axis extending in a longitudinal direction of the vehicle, and a reflector of which a criterion surface is a revolution paraboloid surface having a center axis which lies on the optical axis and a focal point which is positioned at or near a position of the light source.

In the construction of the "lighting device unit", a light distribution pattern may be changed by turning on and off the light source or with the movement of the movable shade for example, a low-beam light distribution pattern is switched to a high-beam light distribution pattern and vice versa, or the light distribution pattern may be fixed.

The light source of the "lighting device unit" may be a discharge light emitting part of the discharge bulb, a filament of an incandescent bulb, such as a halogen bulb, or the like.

The "frame member" may take any form if it is capable of supporting the lighting device unit in a vertically or horizontally swingable fashion in a state that the frame member is supported on the lamp body in a horizontally or vertically swingable fashion.

The "vehicle running conditions" involves various state quantities and outside information on vehicle running, such as vehicle speed, steering angle, vehicle attitude, distance from the self-vehicle and the fore-running vehicle, weather, and navigation information.

As described above, the vehicle headlamp of the invention of the present patent application is characterized in that the technical idea of the present invention is implemented such that a frame member is swingablly supported on the lamp body in a vertical or horizontal direction, and a lighting device unit is swingablly supported on the frame member in a horizontal or vertical direction, and a control unit controls the circular movement of the frame member and the lighting device unit in accordance with vehicle running conditions. The light beam emitted from the lighting device unit may be directed horizontally and vertically in accordance with vehicle running conditions. Accordingly, the beam illuminates the fore scene in a light distribution pattern which reflects current, incessantly varying vehicle running conditions.

In a headlamp in which a lighting device unit for providing a forward beam illumination in a predetermined light distribution pattern, is accommodated within a lamp body, the beam illuminates the fore scene in a light distribution pattern which reflects current, incessantly varying vehicle running conditions. Accordingly, a visibility of the road surface in front of the vehicle is improved.

In the headlamp constructed as mentioned above, a unit swinging mechanism for swinging the lighting device unit may be supported on the frame member. Therefore, the unit swinging mechanism may be handled integrally with the lighting device unit and the frame member. Those may easily be assembled to the lamp body.

Further, in the headlamp constructed as mentioned above, the lighting device unit is supported on the frame member in a state that it is swingable about the vertical axial line passing the optical axis of the frame member. Accordingly, the circular movement of the frame member may be controlled exactly and easily. Further, a space occupied by the swinging locus of the frame member may be minimized. This makes the headlamp main body compact.

BRIEF DESCRIPTION OF THE DRAWINGS

FIG. 6 is a diagram perspectively showing a screen light distribution pattern by a beam emitted forward from the headlamp main body when the vehicle straightforwardly travels;

FIG. 8 is a diagram perspectively showing a screen light distribution pattern by a beam emitted forward from the headlamp main body when the vehicle turns to the right;

FIG. 9 perspectively shows a variation of a screen light distribution pattern by a beam emitted forward from the headlamp main body when the vehicle straight forwardly travels, the pattern variation being due to a vehicle speed difference;

DETAILED DESCRIPTION OF THE DRAWINGS

The preferred embodiment of the present invention will be described with reference to the accompanying drawings.

Figure 1:
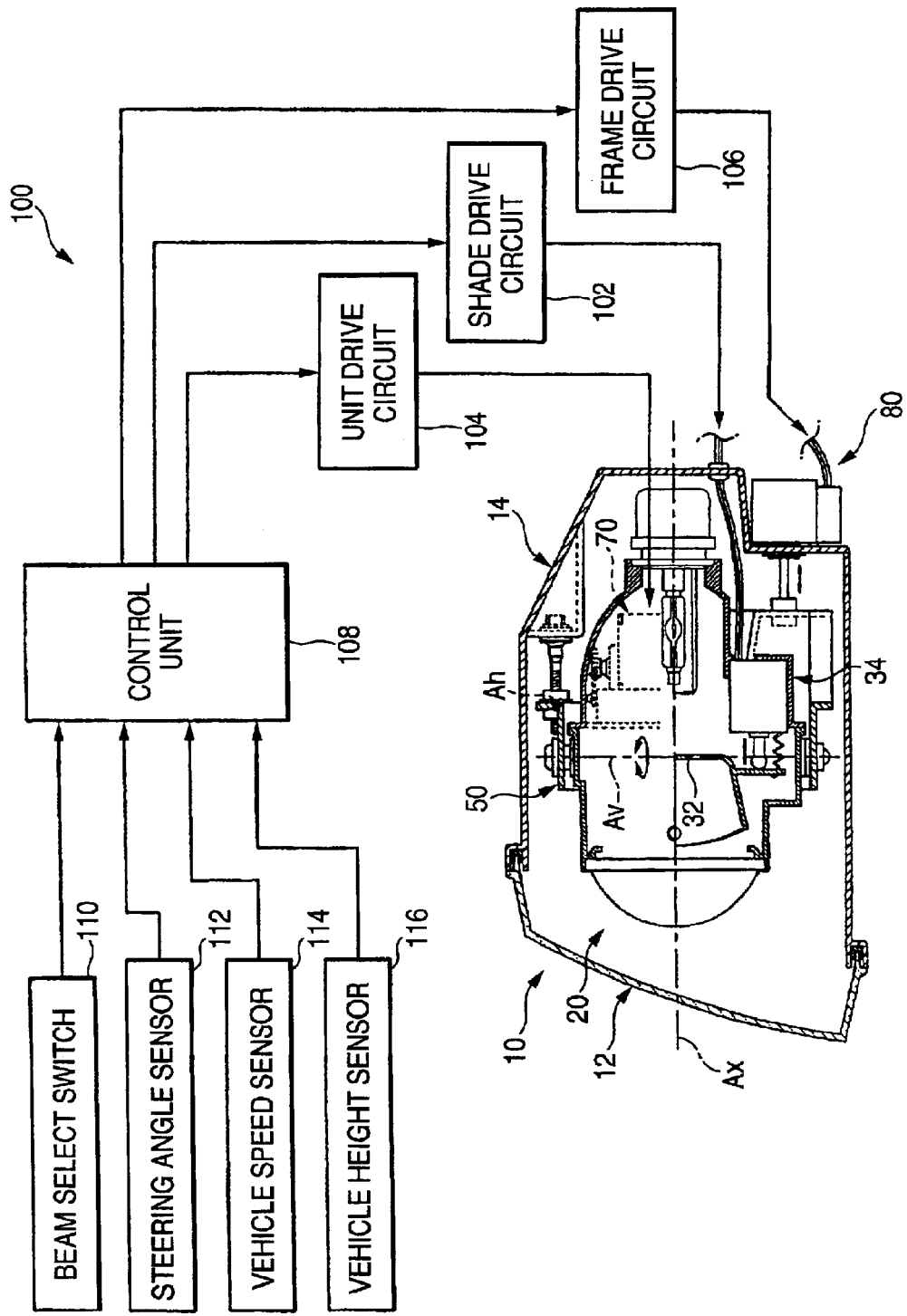
FIG. 1 is a diagram showing an overall arrangement of a vehicle headlamp which is an embodiment of the invention.

FIG. 1 is a diagram showing an overall arrangement of a vehicle headlamp which is an embodiment of the invention.

As shown, the vehicle headlamp designated by reference numeral 100 is made up of a main body 10 of the headlamp, a shade drive circuit 102, a unit drive circuit 104, a frame drive circuit 106, and a control unit 108.

In the headlamp 100, detecting signals that are derived from a beam select switch 110, a steering angle sensor 112, a lamp body 14 and a vehicle height sensor 116 are input to the control unit 108. In response to the signals, the control unit 108 controls the beam illumination by the main body 10 in accordance with vehicle traveling conditions.

The beam select switch 110 is provided for selecting a low-beam light distribution pattern and a high-beam light distribution pattern. The vehicle height sensor 116 consists of a displacement sensor mounted on each of the suspension mechanisms of the front and rear wheels.

The headlamp main body 10 is constructed such that a lighting device unit 20 is accommodated in a lamp chamber defined by a plain or transparent cover 12 and a lamp body 14, and the lighting device unit 20 is supported by the lamp body 14 with the aid of a frame member 50. The lighting device unit 20 is supported such that it is swingable about a vertical axis line Av in horizontal directions. The frame member 50 is vertically swingable about a horizontal axis line Ah with respect to the lamp body 14 in vertical directions.

Figure 2:
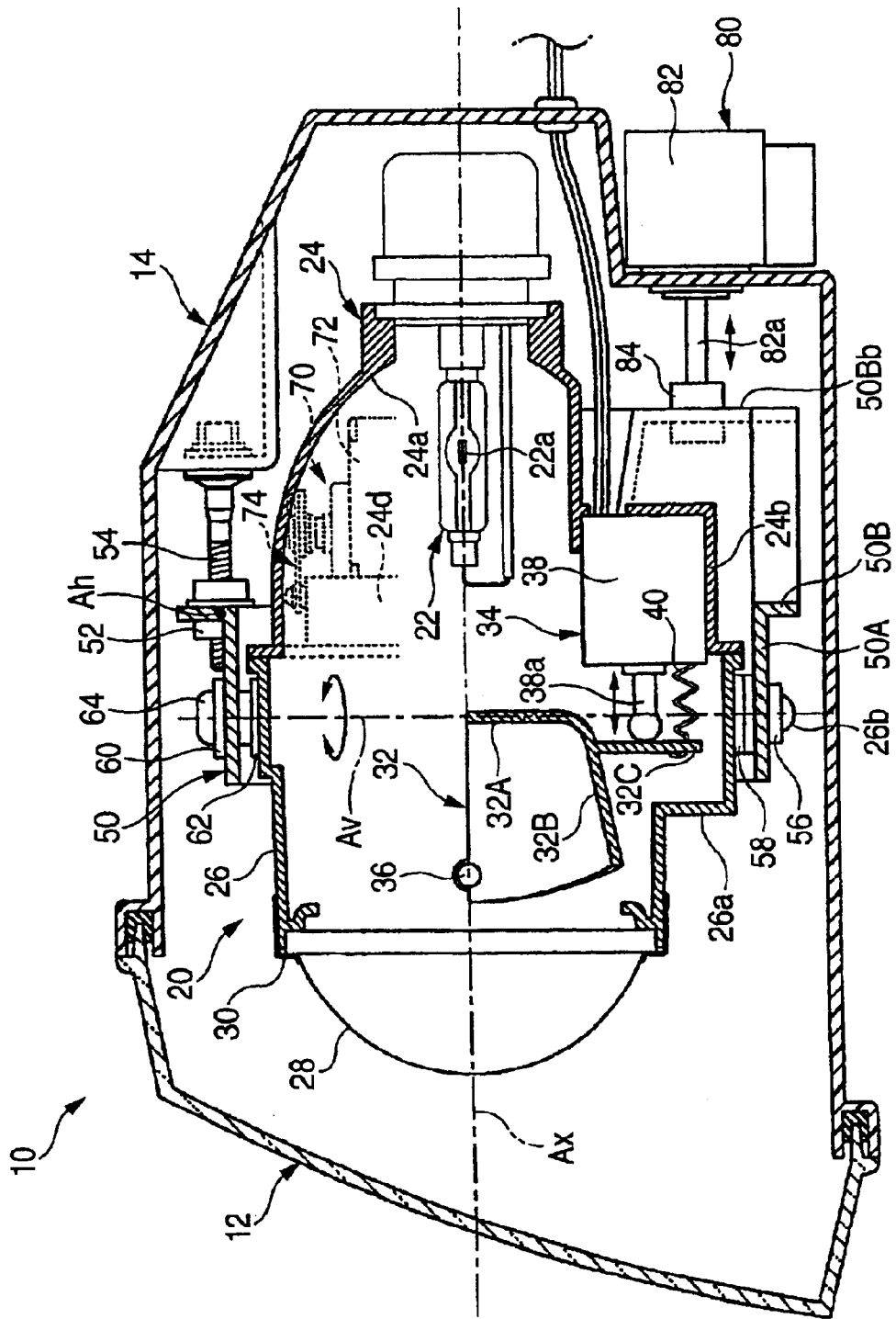
FIG. 2 is a sectional side elevation view showing a main body of a vehicle headlamp.
Figure 3:
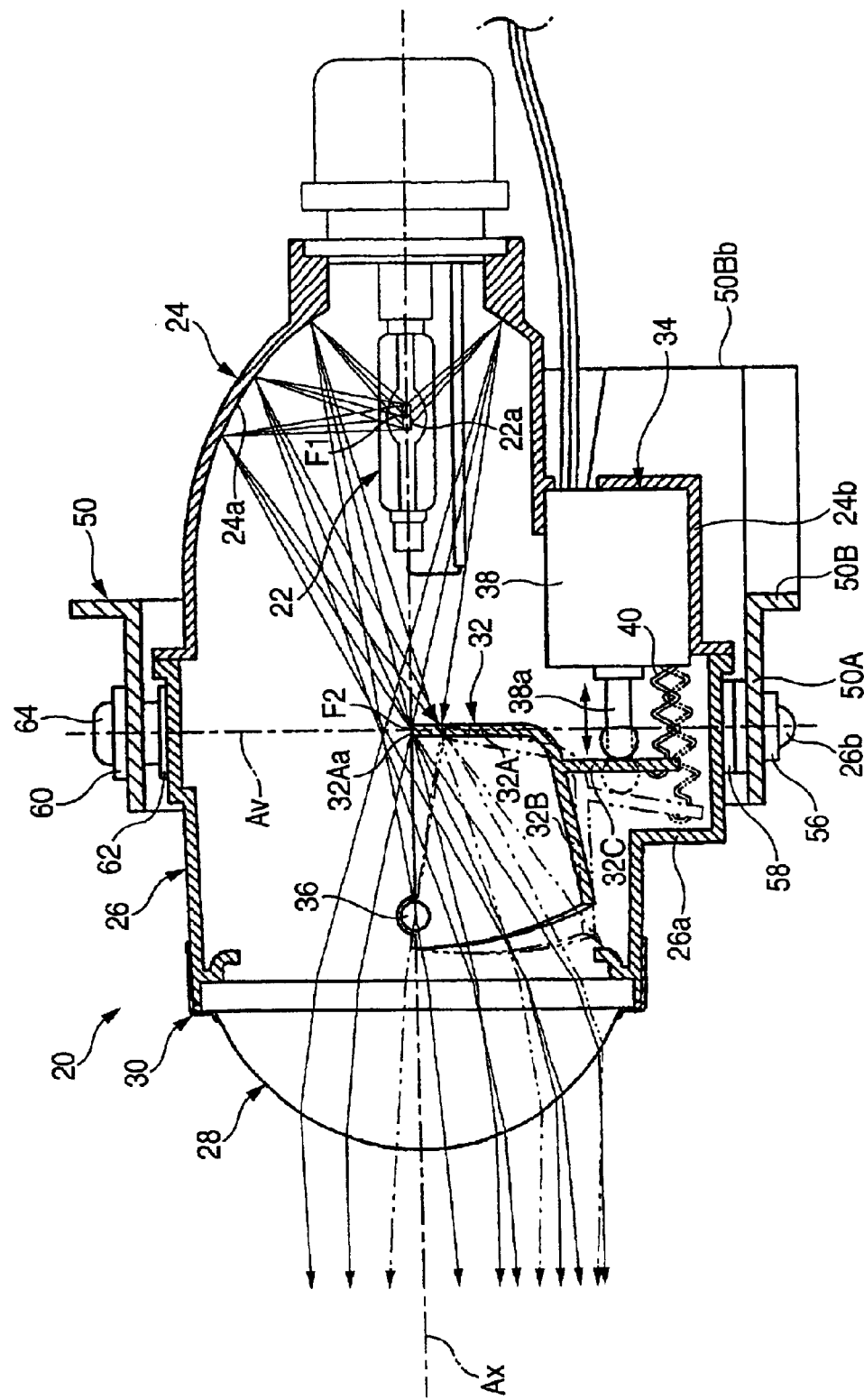
FIG. 3 is a sectional side elevation view showing a lighting device unit of the headlamp main body, together with a frame member.
Figure 4:
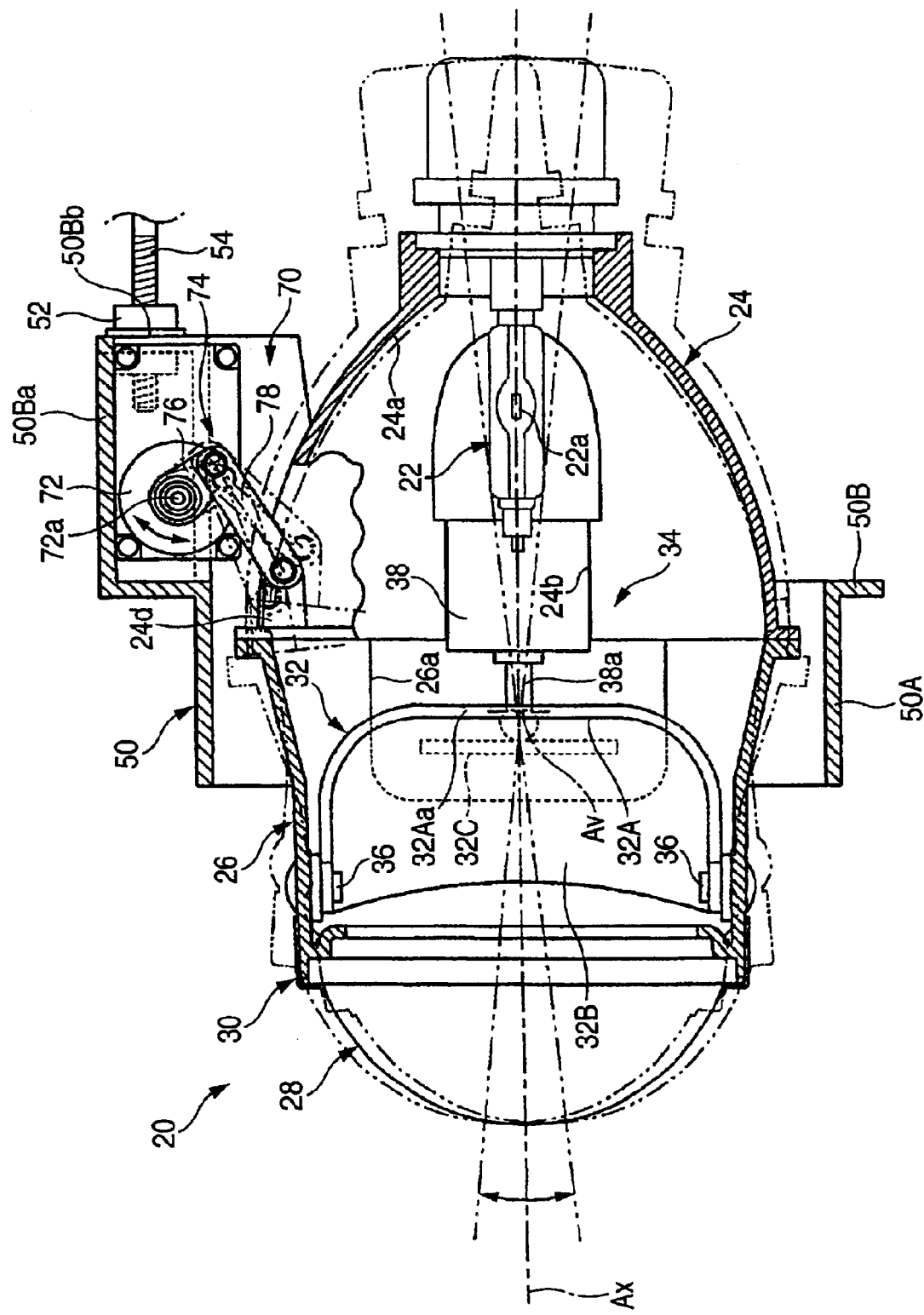
FIG. 4 is a longitudinal sectional view showing the lighting device unit, together with a frame member, when viewed from top.
Figure 5:
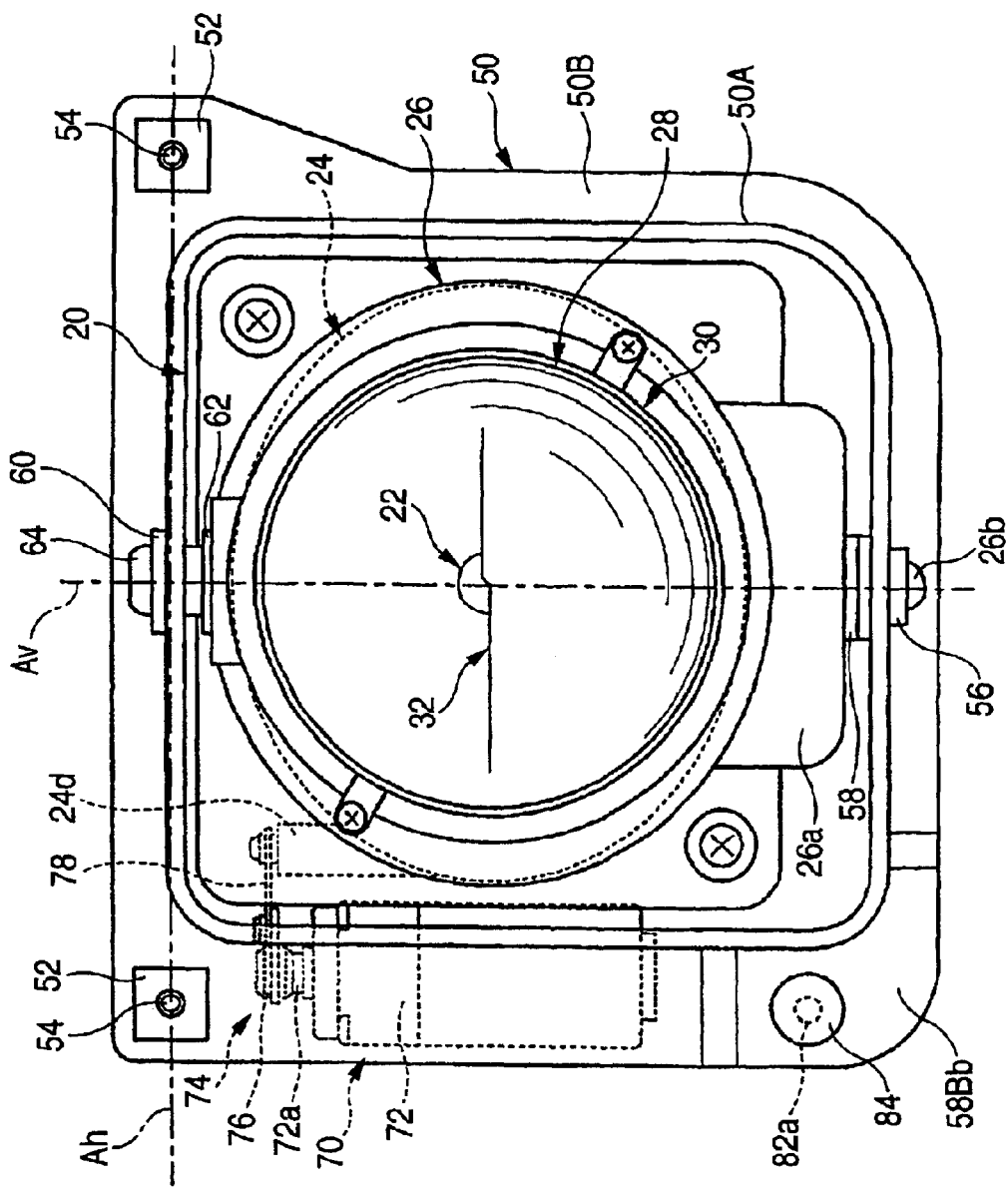
FIG. 5 is a front view showing the lighting device unit, together with a frame member.

FIG. 2 is a sectional side elevation view showing a main body 10 of a vehicle headlamp. FIGS. 3, 4 and 5 are a side elevation view, a longitudinal sectional view (when horizontally viewed) and a front view showing a structure including the lighting device unit 20 and the frame member 50.

The frame member 50 includes a cylindrical part 50A surrounding the lighting device unit 20, which part is rectangular when viewed from the front, and a flange part 50B which extends radially outwardly from the entire circumference of the rear end of the cylindrical part 50A. A sidewall part 50Ba extended rearward is provided at the right side part (left part in FIG. 5) of the flange part 50B of the frame member 50. A right under part 50Bb of the flange part 50B is displaceable a given distance to the rear side.

A unit swinging mechanism 70 for swinging the lighting device unit 20 in horizontal directions is mounted on the sidewall part 50Ba of the frame member 50.

Aiming nuts 52 are, respectively, mounted on the left and right upper end parts of the flange part 50B of the frame member 50. Aiming screws 54, which are rotatably supported on the lamp body 14, are screwed in the aiming nuts 52, respectively. The horizontal axis line Ah consists of a straight line horizontally extending and connecting both the screwing points. A frame swinging mechanism 80 for swinging the frame member 50 in vertical directions is coupled to the right under part 50Bb of the flange part 50B.

In the headlamp main body 10, an initial adjustment (aiming adjustment to align the optical axis Ax with the longitudinal direction of the vehicle) of an optical axis Ax of the lighting device unit 20 is carried out by appropriately turning the aiming screws 54.

The lighting device unit 20 is of the projector type, and is constructed with a discharge bulb 22, reflector 24, holder 26, projection lens 28, retaining ring 30, shade 32, and shade drive mechanism 34.

The discharge bulb 22 is a metal halide lamp, and is mounted on the reflector 24 such that a discharge lighting part 22a (light source) of the bulb is placed on the optical axis Ax.

The reflector 24 has a reflecting surface 24a which is an elliptical spherical surface having its center axis being aligned with the optical axis Ax. The reflecting surface 24a is elliptical in cross section, and its eccentricity gradually increases from the vertical cross section to the horizontal cross section. A rear-side vertex of the ellipsis forming each cross section is set at a fixed position for the cross sections. The discharge lighting part 22a is positioned at a first focal point F1 of the ellipsis which forms the vertical cross section of the reflecting surface 24a. The reflecting surface 24a reflects rays of light emitted from the discharge lighting part 22a forward and toward the optical axis Ax. At this time, the reflecting surface substantially converges the rays of light to a second focal point F2 of the ellipsis in the vertical cross section containing the optical axis Ax.

The holder 26 is cylindrically extended from the front end opening of the reflector 24, and fixedly supported at the rear end part to the reflector 24. The holder 26 fixedly holds, at the front end, the projection lens 28 with the aid of the retaining ring 30. A protruded part 26a is protruded downward from the lower end of the holder 26.

The projection lens 28 is a plano-convex lens which is plane on the rear surface and convex on the front surface, and is located such that its focal point on the rear side is aligned with the second focal point F2 of the reflecting surface 24a. The projection lens 28 thus configured and located permits the rays of light reflected from the reflecting surface 24a of the reflector 24 to pass therethrough in such a way that it converges the rays of light toward the optical axis Ax.

The shade 32 includes a shade body 32A extending along a vertical surface orthogonal to the optical axis Ax, a cylindrical part 32B extending forward from the peripheral edge of the shade body 32A, and a bracket part 32C extending downward from the lower end of the cylindrical part 32B within the protruded part 26a of the holder 26. The shade 32 is pivotally provided in a lower part of the internal space of the holder 26. The shade 32 is supported by the holder 26 supports the shade 32 by means of swing pins 36 at the front end upper parts on the right and left sides of the cylindrical part 32B. With the structure, between a low-beam forming position (indicated by a solid line FIG. 3) and a high-beam forming position (indicated by a two-dot chain line in FIG. 3), the shade is swingable about a horizontal axial line connecting both the pins 36.

When the shade 32 is at the low-beam forming position, the upper edge 32Aa of the shade body 32A is disposed to pass through the second focal point F2. At this position, the shade intercepts part of reflection light from the reflecting surface 24a to remove the upward illuminating light emitted from the lighting device unit 20, and produces a low-beam illuminating light illuminated downward with respect to the optical axis Ax (beam indicated by a solid line in FIG. 3). As a result, a low-beam light distribution pattern P(L) of the left light distribution having a stepped or Z-type cut-off line CL as shown in FIG. 6A is formed.

When the shade 32 is at the high-beam forming position, the shade 32 removes the partial cutting off of the reflecting light from the reflecting surface 24a to permit the upward light illumination from the lighting device unit 20. As a result, a high beam illuminating light (beams indicated by a solid line and a two-dot chain line in FIG. 3). And, a high-beam light distribution pattern P(H) as shown in FIG. 6B is formed.

In each of those low-beam light distribution pattern P(L) and high-beam light distribution pattern P(H), an area indicated by HZ is a hot zone (high intensity zone). FIGS. 6A and 6B perspectively show light distribution patterns, which are formed on a phantom vertical screen located 25 m in front of the lighting device unit 20, by the beam illumination by the lighting device unit (The same shall apply to the subsequent drawings.).

The shade drive mechanism 34 includes a solenoid 38 and a tension coil spring 40. The shade drive mechanism 34 swings the shade 32 between the low-beam forming position and the high-beam forming position to select a low beam or a high beam. The solenoid 38 is inserted into and fixed in a solenoid containing part 24b formed in an under region of the reflector 24 in a state that a plunger (movable iron core) 38a thereof is disposed extending parallel to the optical axis Ax. The spherical front end of the plunger 38a comes in contact with a bracket part 32C of the shade 32. One end of the tension coil spring 40 is latched at the bracket part 32C of the shade 32. The other end of the tension coil spring is latched on the solenoid containing part 24, and constantly urges the shade 32 toward the low-beam forming position. When the beam select switch 110 is operated, the shade drive mechanism 34 is driven by a shade drive circuit 102 under control of the control unit 108.

In the lighting device unit 20, a downward projecting pin 26b is provided on the protruded part 26a of the holder 26 at a position thereof on a vertical axial line Av. The pin 26b is inserted into and supported by the cylindrical part 50A of the frame member 50, with the aid of a collar 56 and a spacer 58. A boss (not shown), protruded upward, is provided at the upper end of the holder 26 at a position thereof on the vertical axial line Av. The boss is inserted into and fixed to the cylindrical part 50A of the frame member 50, with the aid of a collar 60 and a spacer 62. A screw 64 is fastened to the boss with the collar 60 intervening therebetween.

The unit swinging mechanism 70 includes a motor 72 fastened to the sidewall part 50Ba of the frame member 50, and a link mechanism 74 which couples the motor 72 to the lighting device unit 20. The link mechanism 74 includes a swing lever 76 fastened to an output shaft 72a of the motor 72, and a link 78 which is pin coupled at one end to the rotary lever 76. In the unit swinging mechanism 70, the unit drive circuit 104 responds to a control signal from the control unit 108 to drive the motor 72, and a drive force of the driven motor is transmitted to the lighting device unit 20, through the link mechanism 74. In turn, the lighting device unit 20 is swung about the vertical axial line Av to the right or left from an initial adjustment position (at which the optical axis Ax is aligned with the longitudinal direction of the vehicle).

The frame swinging mechanism 80 is composed of a motor 82 fastened to the lower rear wall of the lamp body 14, and a frame coupling bush 84 mounted on the front end of an output shaft 82a of the motor 82. The frame coupling bush 84 is coupled to the right under part 50Bb of the flange part 50B of the frame member 50. In the frame swinging mechanism 80 drives the motor 82, in accordance with a control signal output from the control unit 108, the frame drive circuit 106 drives the motor 82. A drive force of the motor is transmitted through the frame coupling bush 84 to the frame member 50. The frame swinging mechanism 80 is able to swing the lighting device unit 20, together with the frame member 50, about the horizontal axis line Ah within an angular range defined by a predetermined angle from the initial adjustment, in the vertical directions from the initial adjustment position.

A beam illumination control carried out in the headlamp 100 of the embodiment will be described.

As described above, in the instant embodiment, the control unit 108 drives and controls the unit swinging mechanism 70 and the frame swinging mechanism 80, thereby providing a beam illumination control in accordance with vehicle running conditions.

In a situation where the vehicle straight forwardly travels, the headlamp carries out beam illumination at light distribution patterns as shown in FIGS. 6A and 6B. At this time, the unit swinging mechanism 70 and the frame swinging mechanism 80 fix the lighting device unit 20 at the initial adjustment position. In response to an operation of the beam select switch 110, the shade drive mechanism 34 moves the shade 32 to the low-beam forming position or high-beam forming position, whereby the beam illumination is carried out at the low-beam light distribution pattern P(L) shown in FIG. 6A or high-beam light distribution pattern P(H) shown in FIG. 6B.

When the steering operation is performed during the vehicle traveling, the beam illumination is carried out at a light distribution pattern as shown in FIGS. 7A, 7B, 8A or 8B.

Figure 7A:
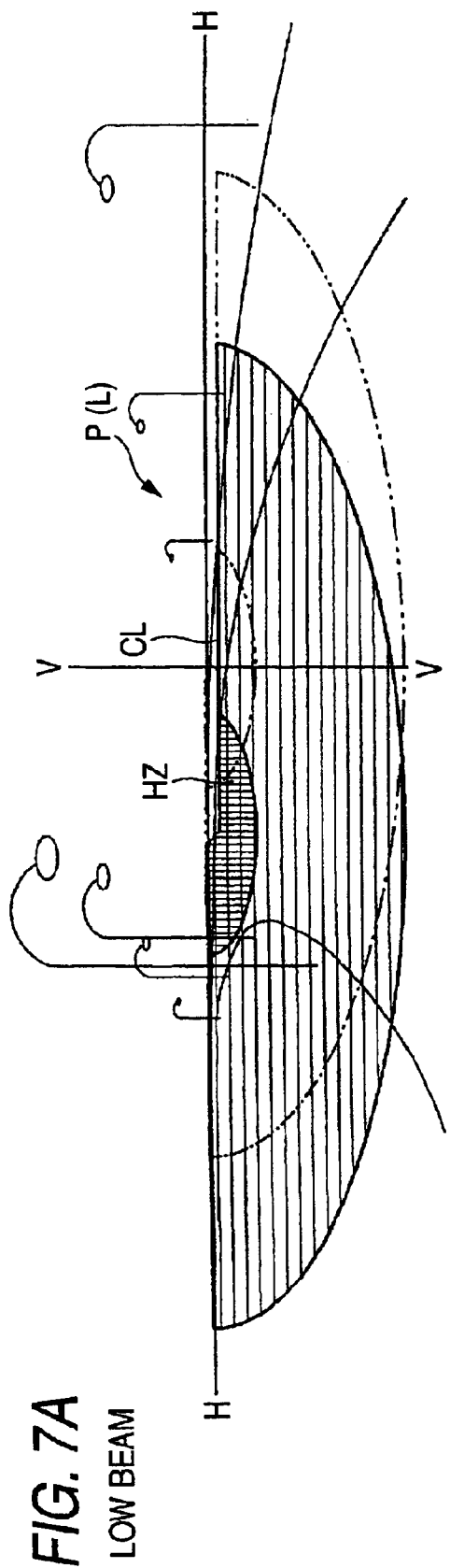
FIG. 7 is a diagram perspectively showing a screen light distribution pattern by a beam emitted forward from the headlamp main body when the vehicle turns to the left.
Figure 7B:
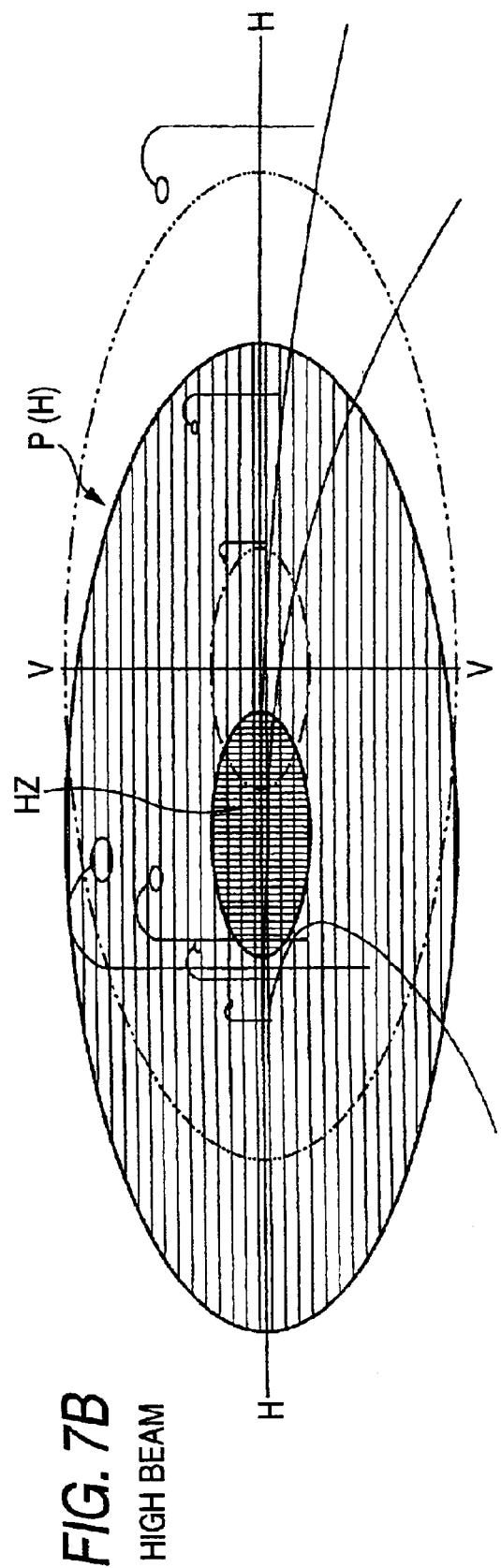

Specifically, when the steering wheel is turned to the left, the lighting device unit 20 is swung to the left direction to displace the low-beam light distribution pattern P(L) and the high-beam light distribution pattern P(H) to the left as shown in FIGS. 7A and 7B. As a result, a visibility of a road surface in front of the vehicle is improved when the vehicle turns to the left. To displace the low-beam light distribution pattern P(L) and high-beam light distribution pattern P(H), the control unit 108 responds to a detect signal from a steering angle sensor 112 and under control of the control unit, the unit drive circuit 104 drives the unit swinging mechanism 70. When the radius of curvature of the vehicle traveling road becomes small, it is preferable to displace the low-beam light distribution pattern P(L) and the high-beam light distribution pattern P(H) greatly to the left in order to improve a visibility of the road in front of the vehicle. An angle of the leftward swing of the lighting device unit 20 is set to be larger as the steering angle becomes larger.

When the steering wheel is turned to the right, the lighting device unit 20 is swung to the right to displace the low-beam light distribution pattern P(L) and the high-beam light distribution pattern P(H) to the right, as shown in FIGS. 8A and 8B, whereby a visibility of the road in front of the vehicle is improved when the vehicle turns to the right. Also in the case of the leftward turning of the vehicle, an angle of rightward swing of the lighting device unit 20 becomes larger as the steering angle becomes larger. When the steering wheel is turned to the right in a low beam illumination state, the lighting device unit 20 is swung to the right, and about 0.5° upward. As a result, as shown in FIG. 8A, the low-beam light distribution pattern P(L) is displaced upward by about 0.5°. The displacement of the low-beam light distribution pattern P(L) is made in a manner that in accordance with a detect signal from the steering angle sensor 112, the control unit 108 controls the frame drive circuit 106 which in turn drives the frame swinging mechanism 80.

The right half of the cut-off line CL of the low-beam light distribution pattern P(L) is stepped down from the left half thereof. Accordingly, when the steering wheel is thus turned to the right, the low-beam light distribution pattern P(L) is displaced upward and the cut-off line CL is moved upward. Then, a remote visibility of the road surface in front of the vehicle in the case of rightward turning of the vehicle is increased. In this case, it is noted that even if the cut-off line CL is moved upward, the hot zone HZ of the low-beam light distribution pattern P(L) is not positioned on an oncoming lane side. There is no chance of imparting glare to the driver of an oncoming vehicle.

The reason why the low-beam light distribution pattern P(L) is not displaced upward when the steering wheel is turned to the left follows. In this case, the left half of the cut-off line CL is stepped up from the right half thereof. Therefore, a remote visibility of the road surface in front of the vehicle when the vehicle turns to the left can be secured even if the cut-off line CL is not moved upward by displacing the low-beam light distribution pattern P(L) upward. When the cut-off line CL is moved upward, the hot zone HZ of the low-beam light distribution pattern P(L) greatly enters the oncoming lane side, thereby possibly imparting glare to the driver on the incoming vehicle.

In a situation that the vehicle straightforwardly runs with a low beam illumination, the beam illumination is carried out at a normal illumination angle at a low/medium vehicle speed where the vehicle speed is lower than a predetermined speed (e.g., 60 km/h). When the vehicle speed exceeds the predetermined speed, the lighting device unit 20 is swung upward by about 0.5° by the frame swinging mechanism 80. Accordingly, at the time of a high speed travelling, as shown in FIG. 9B, the low-beam light distribution pattern P(L) is displaced upward by about 0.5°. In this way, a remote visibility of the road surface in front of the vehicle is sufficiently increased, and a vehicle traveling safety at the high speed running is enhanced. At the high speed running, a distance of the self-vehicle to the fore-running vehicle is generally long. Even if the low-beam light distribution pattern P(L) is displaced somewhat upward, there is no chance of imparting great glare to the drive of the fore-running vehicle.

Figure 10A:
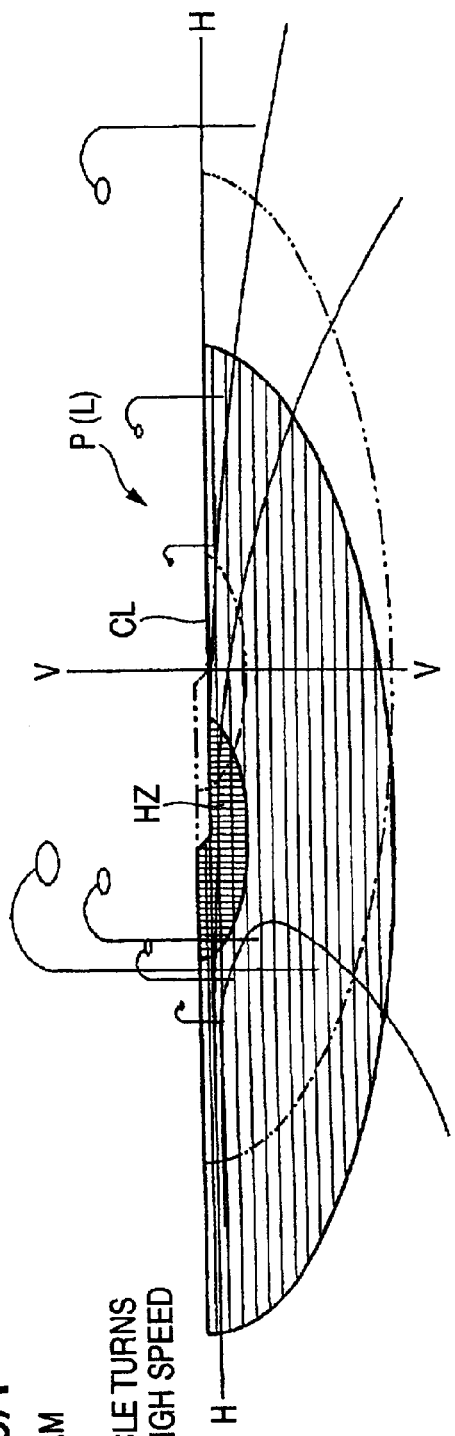
FIG. 10 is a diagram perspectively showing screen light distribution patterns by a beam emitted forward from the headlamp main body when the high speed traveling vehicle turns to the right and left.
Figure 10B:
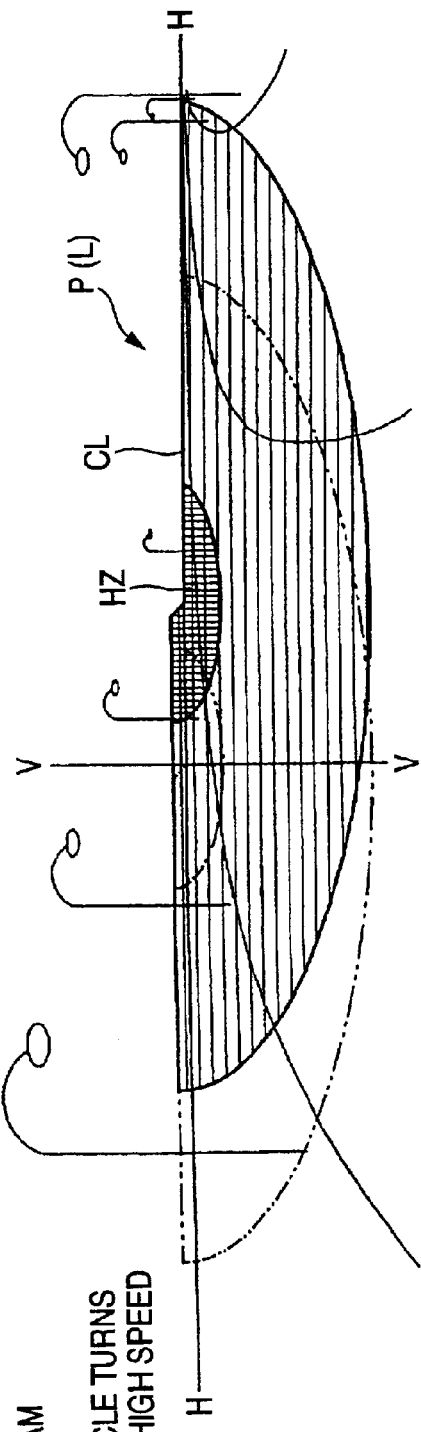

In a situation that the vehicle straightforwardly runs with a low beam illumination, when the steering wheel is turned, the beam illumination takes a light distribution pattern as shown in FIGS. 10A and 10B.

When the steering wheel is turned to the left, the lighting device unit 20 is swung to the left by the unit swinging mechanism 70 in a state that the lighting device unit 20 is swung upward by about 0.5° by the frame swinging mechanism 80 as shown in FIG. 10A, and the low-beam light distribution pattern P(L) is displaced to the left while being left turned upward about 0.5°. As a result, a remote visibility of the road surface in front of the vehicle at the time of high speed leftward turning of the vehicle, is enhanced.

When the steering wheel is turned to the right, the frame swinging mechanism 80 swings the lighting device unit 20 upward about 0.5° as shown in FIG. 10B. In this state, the unit swinging mechanism 70 swings the lighting device unit 20 to the right, so that the low-beam light distribution pattern P(L) is displaced to the right while being displaced upward about 0.5°. As a result, a remote visibility of the road surface in front of the vehicle at the time of high speed rightward turning of the vehicle, is enhanced.

The headlamp 100 of the instant embodiment has also the function of the leveling control of the headlamp main body 10 (leveling control function=function to secure a fixed beam illumination angle to the road surface constant even if the vehicle inclines to the pitching direction with respect to the road surface). The leveling control is performed such that the control unit 108 responds a detect signal from the vehicle height sensor 116, and drives the frame swinging mechanism 80 to cause the lighting device unit 20, together with the frame member 50, to swing in vertical directions.

As described above in detail, in the headlamp 100 of the embodiment, the frame member 50 is supported on the lamp body 14 in a vertically swingable fashion, the lighting device unit 20 is supported on the frame member 50 in a horizontally swingable fashion. The frame member 50 and the lighting device unit 20 are swung in accordance with vehicle running conditions. The light beam emitted from the lighting device unit 20 may be directed horizontally and vertically in accordance with vehicle running conditions. Accordingly, the beam illuminates the fore scene in a light distribution pattern which reflects current, incessantly varying vehicle running conditions. As a consequence, a visibility of the road surface in front of the vehicle is improved.

In the embodiment, the projector type unit is used for the lighting device unit 20. Therefore, the lighting device unit 20 and the frame member 50 may be constructed compact. Accordingly, a freedom of constructing the headlamp 100 is increased.

Also in the embodiment, the unit swinging mechanism 70 for swinging the lighting device unit 20 is supported on the frame member 50. Therefore, the unit swinging mechanism 70 may be handled integrally with the lighting device unit 20 and the frame member 50. Those may easily be assembled to the lamp body 14.

Further, in the embodiment, the lighting device unit 20 is supported on the framemember 50 in a state that it is swingable about the vertical axial line Av passing the optical axis Ax of the frame member 50. Accordingly, the circular movement of the frame member 50 may be controlled exactly and easily. Further, a space occupied by the swinging locus of the frame member 50 (positions indicated by two-dot chainlines when the frame member 50 is maximumly swung) maybe minimized. This makes the headlamp main body 10 compact.

In the embodiment, the frame member 50 is vertically swingably supported on the lamp body 14, and the lighting device unit 20 is horizontally swingably supported on the frame member 50. Alternatively, the frame member 50 may be supported on the lamp body 14 in a horizontally swingable manner, and the lighting device unit 20 may be supported on the frame member 50 in a vertically swingable manner. Also in this alternative, the useful effects as mentioned above may be obtained if the frame member 50 and the lighting device unit 20 are controlled in their circular movement in accordance with the vehicle running conditions.

Also in the embodiment mentioned above, the lighting device unit 20 is of the projector type, and switching between a low beam and a high beam is carried out through the circular movement of the shade 32 by the shade drive mechanism 34 (viz., the 2-bulb headlamp was described). It is evident that the invention may be applied to other types of lighting device units.

Figure 11:
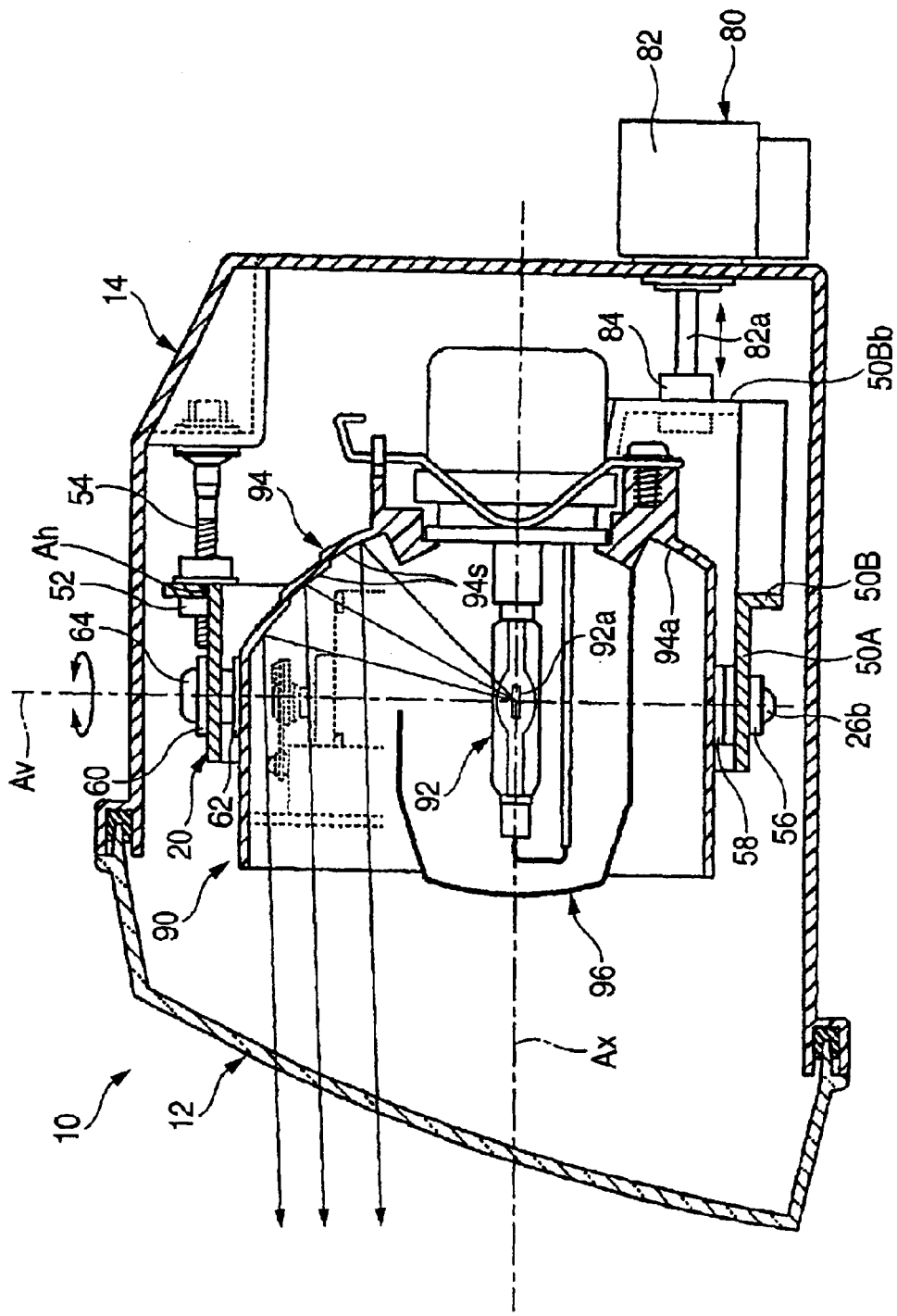
FIG. 11 is a sectional side elevation view showing a main body of a modification of the vehicle headlamp shown in FIG. 11.

For example, the invention may be applied to a parabolic lighting device unit 90 as shown in FIG. 11.

The lighting device unit 90 includes a discharge bulb 92, a reflector 94 and a shade 96.

The discharge bulb 92 is mounted on the reflector 94 such that a discharge light emitting part 92a (light source) is disposed on an optical axis Ax extending in the longitudinal direction of the vehicle.

For the reflector 94, its reflecting surface 94a is formed of which a rotation criterion surface is a revolution paraboloid surface having a center axis which lies on an optical axis Ax extending in the vehicle longitudinal axis, and a focal point which is positioned at or near a position of the discharge light emitting part 92a. A plurality of reflecting elements 94s are formed on the criterion surface of the reflecting surface 94a. By diffracting and deflecting operations by those reflecting element 94s, the lighting device unit provides a low beam illumination in a predetermined low-beam light distribution pattern.

The shade 96 covers the discharge light emitting part 92a over a predetermined range, and intercepts the rays of light unnecessary for the beam illumination in a low-beam light distribution pattern.

The lighting device unit 90 has such a construction that the shade 96 is a fixed shade, and the unit provides a beam illumination in a low-beam light distribution pattern (viz., the construction of the type 2 of 4-bulb headlamp).

The lighting device unit having such a construction can produce the effects comparable with those of the above-mentioned embodiment if the frame member 50 is supported on the lamp body 14 in a vertically swingable manner, and the lighting device unit 90 is supported on the frame member 50 in a horizontally swingable manner, and the circular movements of the frame member 50 and the lighting device unit 90 are controlled in accordance with vehicle running conditions. With such a construction, the beam emitted from the lighting device unit 90 is vertically and horizontally varied in its direction in accordance with vehicle running conditions, and hence, the beam illumination is performed in a light distribution pattern which reflects current, incessantly varying vehicle running conditions.

What is claimed is:

1. A vehicle headlamp comprising:

a lamp body;

a frame member swingablly supported on said lamp body in a first direction;

a lighting device unit which forms a forward beam illumination in a predetermined light distribution pattern, said lighting device unit swingablly supported on said frame member in a second direction perpendicular to the first direction; and a control unit which controls the swing movement of said frame member and said lighting device unit in accordance with vehicle running conditions.

2. A vehicle headlamp according to claim 1, wherein a mechanism for swinging said lighting device unit is supported on said frame member.

3. A vehicle headlamp according to claim 1, wherein said lighting device unit is supported on said frame member in a state that said lighting device unit is swingable about a vertical line passing an optical axis of said lighting device unit.

4. A vehicle headlamp according to claim 1, wherein said lighting device unit is constructed as a projector type unit which includes a light source disposed on an optical axis extending in a longitudinal direction of the vehicle, a reflector for reflecting the rays of light emitted from said light source forward and toward said optical axis, a projection lens provided in front of said reflector, and a shade for intercepting part of reflection light from said reflector, said shade being located between said projection lens and said reflector.

5. A vehicle headlamp according to claim 1, wherein said lighting device unit is constructed as a parabolic lighting device unit which includes a light source disposed on an optical axis extending in a longitudinal direction of the vehicle, and a reflector of which a criterion surface is a revolution paraboloid surface having a center axis which lies on said optical axis and a focal point which is positioned at or near a position of said light source.

6. A vehicle headlamp according to claim 1, further comprising a shade extending along a vertical surface perpendicular to an optical axis of the lighting device, said shade being pivotally supported in said lighting device between a high-beam forming position and a low-beam forming position.

\* \* \* \* \*